US 6,643,910 B2

(12) United States Patent
Kanai et al.

(10) Patent No.: US 6,643,910 B2
(45) Date of Patent: * Nov. 11, 2003

(54) DEVICE AND METHOD FOR MOLDING MOTOR COILS

(75) Inventors: Yasuhiro Kanai, Gunma-ken (JP); Susumu Aoki, Kiryu (JP)

(73) Assignee: Mitsuba Corporation, Gunma-Ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 8 days.

(21) Appl. No.: 09/021,656

(22) Filed: Feb. 10, 1998

(65) Prior Publication Data

US 2002/0066174 A1 Jun. 6, 2002

(30) Foreign Application Priority Data

Feb. 10, 1997  (JP) .............................. 9-026870

(51) Int. Cl.[7] .................. H02K 15/00; H02K 15/14; H02K 15/16
(52) U.S. Cl. .................. 29/596; 29/592; 29/592.1; 29/597; 29/598; 29/605; 29/606
(58) Field of Search .................. 29/592, 596, 592.1, 29/598, 597, 605, 606, 607, 608, 609; 310/43, 42, 45, 86, 87; 264/272.15, 272.19, 272.11, 272.12, 272.13, 247, 272.2

(56) References Cited

U.S. PATENT DOCUMENTS

| | | | | |
|---|---|---|---|---|
| 1,888,613 A | | 11/1932 | Apple | |
| 2,019,064 A | * | 10/1935 | Apple | 18/42 |
| 2,820,914 A | * | 1/1958 | Rudoff et al. | 310/43 |
| 3,678,436 A | * | 7/1972 | Herdrich et al. | 335/284 X |
| 3,769,756 A | * | 11/1973 | Kipple et al. | 51/43 X |
| 5,130,596 A | * | 7/1992 | Umeki | 310/234 X |
| 5,397,063 A | * | 3/1995 | Weinstein | 239/703 X |
| 5,490,319 A | * | 2/1996 | Nakamura et al. | 29/596 X |
| 5,634,258 A | | 6/1997 | Onodera et al. | 29/598 |
| 5,759,589 A | * | 6/1998 | George, Jr. | 425/129.1 |

FOREIGN PATENT DOCUMENTS

| | | | |
|---|---|---|---|
| DE | 43 38 913 A1 | 5/1995 | |
| EP | 0 387 666 A1 | 9/1990 | |
| EP | 0 711 022 A1 | 8/1996 | |
| EP | 0 793 331 A1 | 9/1997 | |
| JP | 8-140318 | 5/1996 | .......... H02K/15/12 |

* cited by examiner

*Primary Examiner*—Valencia Martin-Wallace
*Assistant Examiner*—Binh-An D. Nguyen
(74) *Attorney, Agent, or Firm*—MacPherson Kwok Chen & Heid LLP

(57) ABSTRACT

In molding coils wound around a motor rotor with resin material in a die assembly, the coil ends projecting from either axial end of the motor core are compressed radially inward by small diameter portions formed in the die surface. Because the unnecessary deposition of the resin material over the coil ends is minimized, the material cost can be reduced. Also, the elimination or the reduction of the need to eliminate excess resin material from the coil ends simplifies the production process, and reduces the production cost. Additionally, the reduction in the mass of the resin material over the coil ends, as well as the constraining of the coil wire into a relatively radially inner parts reduces the moment of inertia of the motor rotor, and can thereby improve the performance of the motor.

9 Claims, 3 Drawing Sheets

DEVICE AND METHOD FOR MOLDING MOTOR COILS

TECHNICAL FIELD

The present invention relates to a device and a method for molding coils placed around core teeth of a rotor core of an electric motor with resin material.

BACKGROUND OF THE INVENTION

Conventionally, it is known that when the coil wire for motor coils is subjected to a tension as it is passed through core slots of a rotor core, the edges of the core teeth could damage the insulating film of the coil wire. Therefore, it has been customary to design a coil forming machine for forming motor coils around core teeth in such a manner as to avoid applying tension to the coil wire. Once the coils are placed around the core teeth, the rotor core is covered by insulating material such as thermosetting resin.

In such a motor production process, typically, the rotor core is preheated after the coils are placed in the core slots, and the resin material is then coated over the rotor core. The resin coating is adjusted, and is cured. After the resin coating has fully cured, the outer profile of the rotor is cut into a prescribed shape by machining. Although the resin coating process can be carried out by using an automated machine, the process of adjusting the resin coating is required to be carried out manually. Therefore, a significant time period (for instance about 2 hours) must elapse from the start of the pre-heating process to the completion of the curing process. Therefore, the coil wire which has been received in the core slots may spring back out of the core slot during this time period, and a projecting part of the coil wire could be cut by the machine tool during the process of shaping the motor rotor.

This can be avoided by using wedges to prevent the spring back of the coil wire as illustrated in FIG. 5. After the coils 8 are wound around the core 4 of the rotor 3, and before the resin coating is formed, a wedge 11 is inserted into each core slot 4a from an axial end of the rotor core 4 in such a manner as to be engaged by a laterally expanded part of each core tooth 4b, and prevent the wire of the coils 8 from expanding radially out of the core slot 4a. However, when the rotor 3 has a large number of core slots 4a, a corresponding number of wedges 11 have to be inserted in the core slots 4a, and this leads to an increase in the material cost and a complication of the production process.

Also, according to the conventional motor rotor, the shape of the coil wire extending from the axial end of one core slot into another or the shape of the coil end is relatively indeterminate, and it has been necessary to leave a significant amount of resin coating deposited in this part because of the fear of cutting into the coil wire when cutting the resin coating away from this part. The excessive deposition of resin coating is not desirable as it increases the moment of inertia of the motor rotor, and therefore reduces the performance of the motor.

U.S. Pat. No. 5,634,258 issued Jun. 3, 1997 discloses a method for molding motor coils in resin material which uses the flow of the resin material to control the spring back of the coil wire. The contents of this patent are hereby incorporated in this application by reference.

BRIEF SUMMARY OF THE INVENTION

In view of such problems of the prior art, a primary object of the present invention is to provide a method and a device for molding coils placed around a motor core with resin material which can reduce both the material cost and the production cost.

A second object of the present invention is to provide a method and a device for molding coils placed around a motor core with resin material which can improve the performance of the motor.

According to the present invention, these and other objects can be accomplished by providing a motor coil molding device for molding coils wound around a motor rotor with resin material in a die assembly, the die assembly including upper and lower die halves which can be closed so as to define a cavity for receiving a motor rotor coaxially therein, and opened so as to allow placing and removing the motor rotor in and out of the cavity, the cavity including: a main part for receiving a rotor core coaxially therein so as to define a small annular gap between the rotor core and the opposing die surface; support portions for supporting two shaft ends of the motor rotor, typically, in a sealing relationship; and intermediate parts each defined between the main part and a different one of the support portions; at least one of the intermediate parts including a small diameter portion defining a substantially smaller inner diameter than the main part.

This device can be conveniently used for carrying out a motor coil molding method comprising the steps of: placing a motor rotor in the die cavity; radially constraining a coil end at an axial end of the rotor core with coil end constraining means, such as a small diameter portion defining a substantially smaller inner diameter than the main part in an intermediate part defined between the main part and one of the support portions; injecting resin material from a radially peripheral part of the die assembly so as to force coil wire received in core slots radially inward by a flow of the resin material; and curing the resin material deposited around the motor rotor. Typically, the method further comprises the step of removing the resin material from an outer circumferential surface of the motor rotor by machining.

Thus, because the coil end of the motor rotor can be appropriately covered by the smaller diameter portion during the molding process, the deposition of the resin material over the coil end can be minimized so that the costs for the material and the production can be reduced, and the moment of inertia of the motor rotor can be reduced. Because the coil wire at the coil end is pushed radially inward, the moment of inertia of the rotor owing to the mass of the coil wire is reduced for this reason also. To effectively retain the coil wire in each core slot against the tendency of the coil wire to spring back, the die assembly may include an injection hole for introducing the resin material from a radially peripheral part of the die assembly. The flow of the resin material is thereby directed radially inward, and then axially in either direction in the die cavity so that the flow of the resin material counteracts the tendency of the coil wire to spring back.

The small diameter portion may either extend from an axial end portion of the cavity to a region adjacent an axial end of the rotor core or be defined by an annular ridge having a relatively small axial width. The small diameter portions may be formed by two halves formed in the upper and lower die halves in either case.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
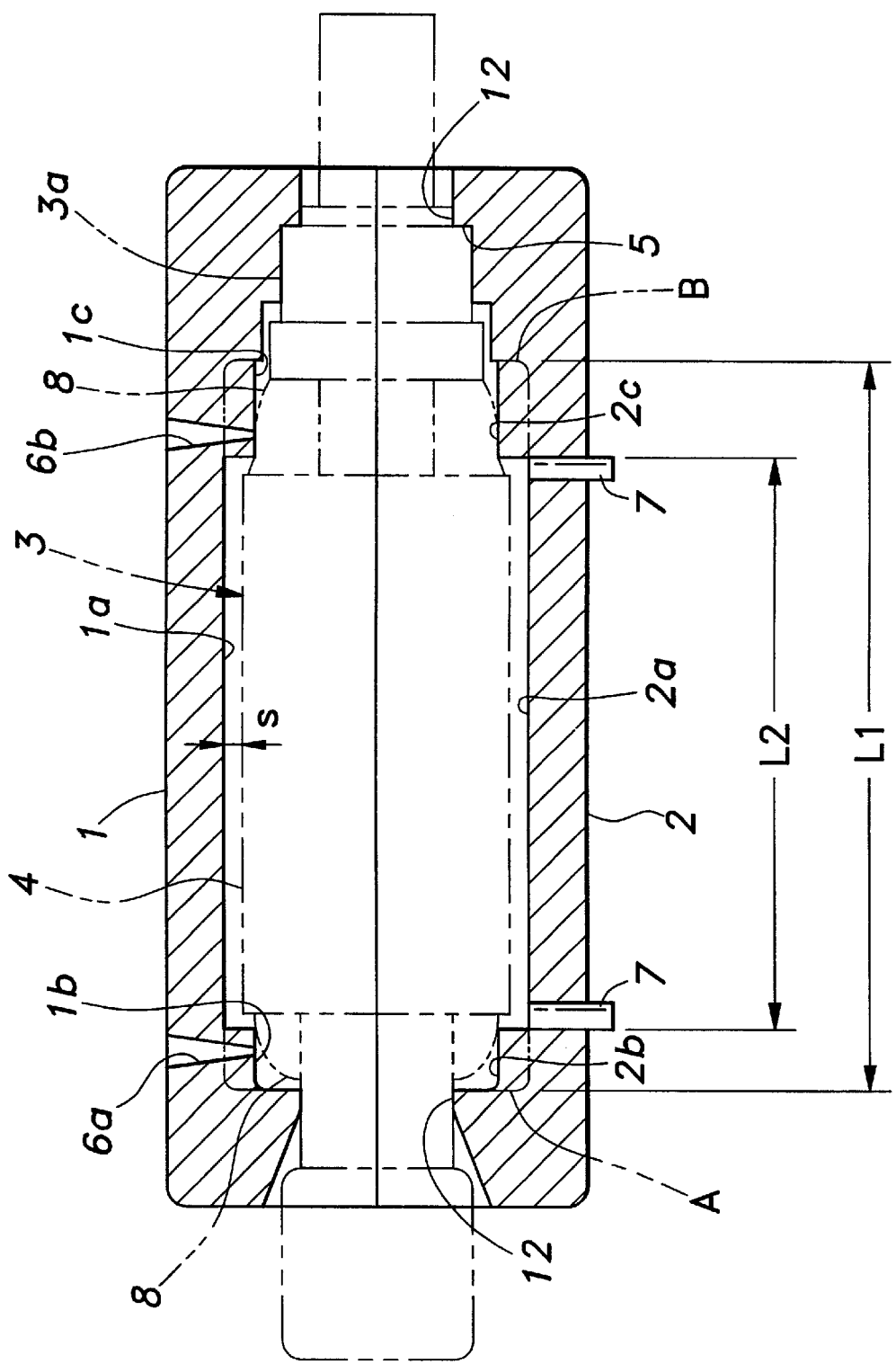
FIG. 1 is a simplified longitudinal sectional view of a die assembly for molding motor coils with resin material embodying the present invention.

FIG. 1 shows a die assembly for injecting resin material into a motor rotor embodying the present invention. This die assembly comprises an upper die half 1 and a lower die half 2 which are supported by a frame, not shown in the drawing in such a manner as to be opened and closed as desired. When the upper and lower die halves 1 and 2 are closed upon each other, an inner die cavity is defined jointly by inner surfaces 1a and 2a of the upper and lower die halves 1 and 2. The two axial ends of the die assembly comprise support parts 12 for supporting two axial end portions of a core 4 of a motor rotor 3 in a sealing relationship so as to prevent leakage of the resin material from the axial ends. One of the support parts 12 includes a reference surface 5 consisting of an annular shoulder surface for engaging an axial end of a commutator 3a of the rotor 3 so as to position the rotor 3 in the die assembly with respect to the axial direction.

The upper die half 1 is provided with reduced diameter surfaces 1b and 1c at respective intermediate parts, each defined between a main part of the die cavity and a corresponding one of the support parts 12 so as to oppose a corresponding one of coil end portions of the rotor 3. The lower die half 2 is provided with corresponding reduced diameter surfaces 2b and 2c which cooperate with the reduced diameter surfaces 1b and 1c of the upper die half 1 so as to jointly define reduced diameter portions (1b and 1c; and 2b and 2c) for compressing the corresponding coil ends when the die assembly is closed.

The reduced diameter surfaces 1b and 1c of the upper die half 1 are respectively provided with injection holes 6a and 6b communicating the interior of the cavity with the outside for introducing fluid resin material under pressure from a resin supply device (not shown in the drawings) into the cavity. The lower die half 2 is provided with knock out pins 7 for ejecting the rotor 3 from the die assembly when it is molded with resin material.

Figure 2:
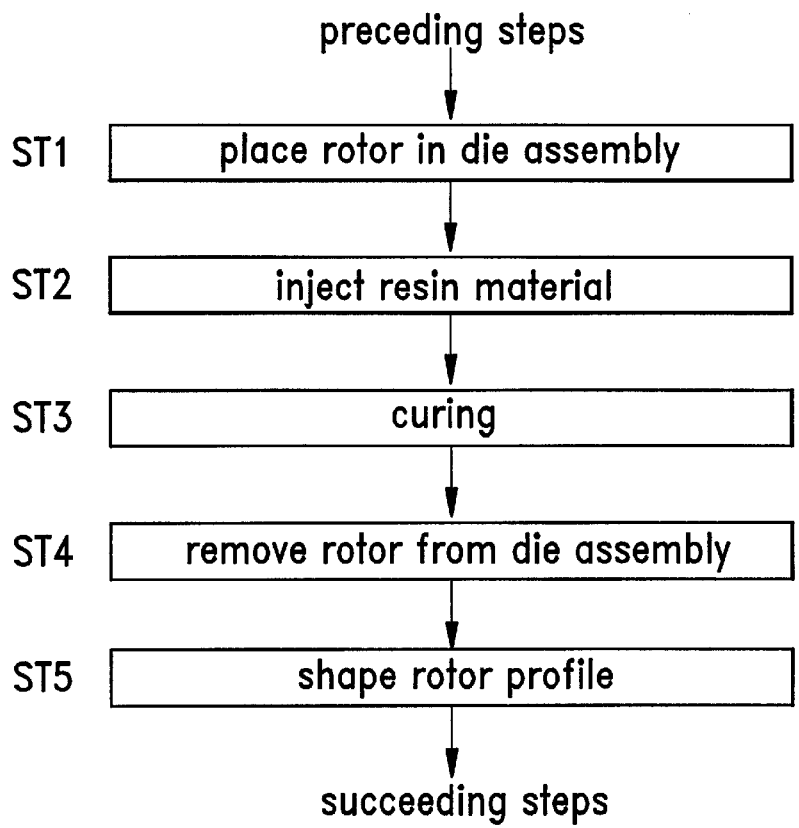
FIG. 2 is a flow chart showing the steps of carrying out the molding process according to the present invention.
Figure 3:
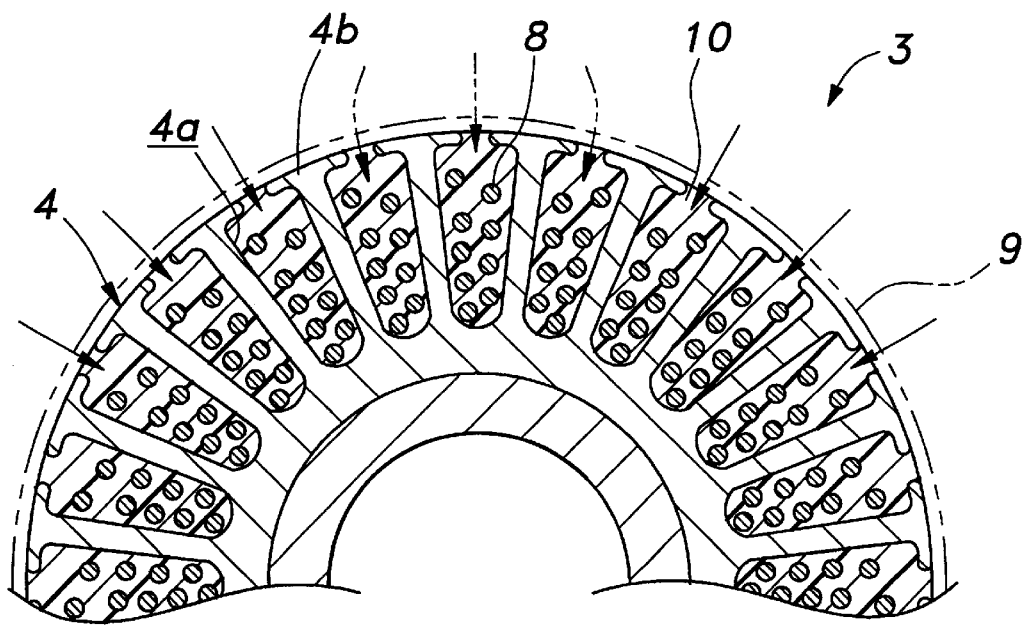
FIG. 3 is a fragmentary cross sectional view of a motor rotor.

The process of injecting resin material 10 into and around the rotor 3 in this die assembly is described in the following with reference to FIG. 2. In step ST1, the rotor having coils 8 wound thereon in the preceding step is placed inside the die assembly, and after being positioned therein by using the reference surface 5, the die assembly is closed. The small diameter portions 1b and 1c, and 2b and 2c jointly defined by the small diameter surfaces constrain or compress the corresponding axial ends of the coils as indicated by the solid-line arrows in FIG. 3. Thus, the looped coil ends are compressed into having a smaller radial extent on the one hand, and the coil wire inside the core slots is thereby pulled radially inward on the other hand.

In step ST2, the resin material is injected into the die assembly from the injection holes 6a and 6b. The resin material, for instance, may consist of BMC (bulk mold compound) which is heated to the temperature of about 40° C. The resin material 10 is thus injected from two points located on radially outer peripheral parts at either axial end of the die cavity. The main part defined by the die surfaces 1a and 2a corresponding to the outer circumferential surface of the rotor core 3 is oversized with respect to the outer diameter of the rotor core 3 so as to define an annular gap s (for instance 0.2 to 0.4 mm) between the outer surface of the rotor core 3 and the opposing inner surface of the die assembly. Therefore, when the resin material is injected from the injection holes 6a and 6b in step ST2, the resin material initially covers the coil ends on both axial ends of the rotor core, and fills into this annular gap. Then, the flow of the resin material is directed radially inward into each of the core slots. This causes the coil wire to be pushed deeper into the bottom portion of each core slot.

The time period required for injecting the resin material may be approximately one minute in the case of a rotor core for a small motor having an outer diameter of 70 mm and approximately 30 core slots. The resin material filled into the core is allowed to cure for the time period of about 100 seconds in step ST3. When no resin material is filled into the rotor core, the coils 8 typically spring back in about one hour. However, according to the present invention, because the flow of the resin material forces the coil wire into the core slots, and the resin material is allowed to partially cure while the coil ends are radially inwardly restrained by the small diameter portions of the die assembly, it is possible for the resin material to fully cure before the coils make any appreciable spring back. The rotor core having the coils 8 retained in the core slots by the resin material is then transferred to the next step.

Conventionally, the resin material was molded over the coil ends so as to define an outer diameter identical to that of the main part of the rotor core, and was thereafter cut away by machining. Therefore, a significant amount of the resin material 10 was required to be removed, and this caused corresponding increases in the material cost and the production cost. On the other hand, according to the arrangement embodying the present invention, the small diameter portions of the die assembly at respective axial ends prevent any excessive deposition of the resin material over the coil ends. Therefore, according to this arrangement, the amount of the resin material required to be removed from the coil ends is minimized, or the process of removing excess resin material from the coil ends may be totally eliminated. As shown in FIG. 1, the axial extent L2 that needs to be machined according to the present invention is substantially smaller than the axial extent L1 according to the prior art. The imaginary lines A and B indicate the profile of the conventional die cavity. Furthermore, according to the prior art, a resin material layer of a certain depth must be left over the coil ends because of the fear of cutting into the coil wire. According to the present invention, such a fear does not exist, and the thickness of the resin material layer over the coil ends can be substantially reduced so that the moment of inertia of the motor can be reduced, and the performance of the motor can be improved. Also, because the part of the coil wire at each coil end and inside each slot is pushed radially inward by the small diameter portions, the moment of inertia owning to the mass of the coil wire is also reduced.

Figure 4:
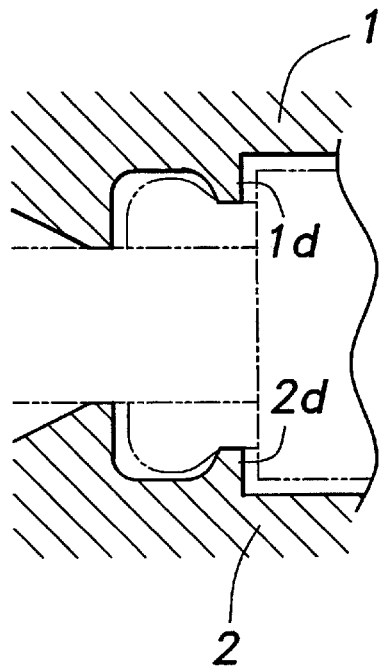
FIG. 4 is a fragmentary longitudinal sectional view of a second embodiment of the die assembly for molding motor coils with resin material.
Figure 5:
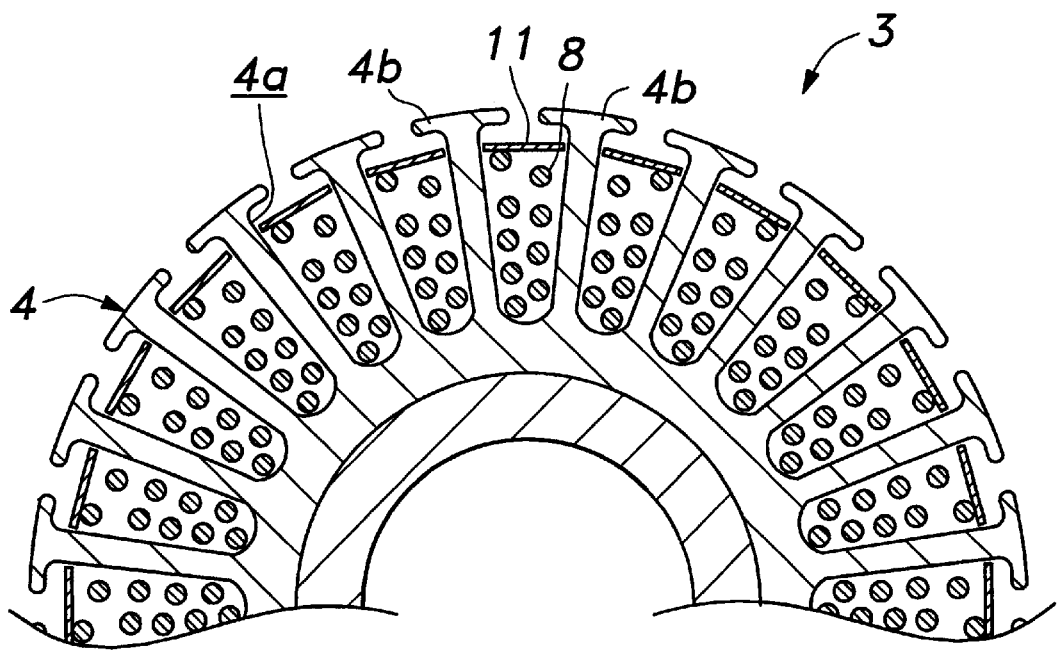
FIG. 5 is a view similar to FIG. 3 showing a conventional arrangement.

FIG. 4 shows a second embodiment of the present invention. In this embodiment, a coaxial annular ridge 1d and 2d is defined at each axial end of the die assembly. The annular ridge 1d and 2d is defined by two halves 1d and 2d formed in the upper and lower die halves 1 and 2 of the die assembly. Thus, each coil end is constrained or compressed along a narrow circular region instead of substantially over the entire coil end. Depending on the application, the second embodiment is more preferable because excessive compression of the coil ends may be avoided.

Thus, according to the above described embodiments, because the unnecessary deposition of the resin material over the coil ends is minimized, the material cost can be reduced. Also, the elimination or the reduction of the need to eliminate excess resin material from the coil ends simplifies the production process, and reduces the production cost. Additionally, the reduction in the mass of the resin material over the coil ends, as well as the constraining of the coil wire into a relatively radially inner parts reduces the moment of inertia of the motor rotor, and can thereby improve the performance of the motor.

Although the present invention has been described in terms of preferred embodiments thereof, it is obvious to a person skilled in the art that various alterations and modifications are possible without departing from the scope of the present invention which is set forth in the appended claims.

What we claim is:

1. A motor coil molding method for molding coils wound around a motor rotor with resin material, comprising:

providing a die assembly having a first half and a second half and defining a die cavity therein, said die cavity including a main part for receiving a rotor core coaxially therein so as to define a small annular gap between the rotor core and the opposing die surface, and at least a first support portion for supporting a shaft end of the motor rotor, said die cavity further including at least a first constraining portion jointly defined by said first half and said second half of said die assembly, said first constraining portion being located between said main part and said first support portion, said first constraining portion having an inner diameter smaller than an inner diameter of said main part;

placing a motor rotor in said first half of said die assembly;

radially constraining a coil end at an axial end of the rotor core with said first constraining portion jointly defined by said first half and said second half of said die assembly as said first half and said second half are brought together in a radial direction;

injecting resin material from a radially peripheral part of said die assembly so as to force coil wire received in core slots radially inward by a flow of said resin material; and curing said resin material deposited around the motor rotor.

2. The motor coil molding method according to claim 1, further comprising the step of removing the resin mold material from an outer circumferential surface of said motor rotor by machining.

3. A motor coil molding method for molding coils wound around a motor rotor with resin material, comprising:

providing a die assembly having a first half and a second half and defining a die cavity therein, said die cavity including a main part for receiving a rotor core coaxially therein so as to define a small annular gap between the rotor core and the opposing die surface, and at least a first support portion for supporting a shaft end of the motor rotor, said die cavity further including at least a first constraining portion jointly defined by said first half and said second half of said die assembly, said first constraining portion being located between said main part and said first support portion, said first constraining portion having an inner diameter smaller than an inner diameter of said main part;

placing a motor rotor in said first half of said die assembly;

radially constraining a coil end at an axial end of the rotor core with said first constraining portion jointly defined by said first half and said second half of said die assembly as said first half and said second half are brought together in a radial direction;

injecting resin material from a radially peripheral part of said die assembly so as to force coil wire received in core slots radially inward by a flow of said resin material; and curing said resin material deposited around the motor rotor, said die cavity including a second support portion for supporting an opposite shaft end of the motor rotor, and a second constraining portion jointly defined by said first half and said second half of said die assembly, said second constraining portion being located between said main part and said second support portion, said second constraining portion having an inner diameter smaller than an inner diameter of said main part, and further comprising radially constraining a coil end at an opposite axial end of the rotor core with said second constraining portion as said first half and said second half are brought together in a radial direction.

4. The motor coil molding method according to claim 1, wherein injecting resin material includes injecting resin material directly into the first constraining portion of the die cavity.

5. A motor coil molding method, comprising:

winding coil wire around a motor rotor having a plurality of core slots provided therein, two axial ends of said motor rotor each defining a coil end, said coil wire being received in said core slots;

placing said motor rotor in a die cavity of a die assembly, said die assembly having a first half and a second half, said die cavity including a main part for receiving a rotor core coaxially therein, and first and second constraining portions jointly defined by said first half and said second half of said die assembly;

supporting said motor rotor with first and second support portions in said die cavity of said die assembly;

radially constraining each coil end with an associated one of said first and second constraining portions of said die assembly as said first half and said second half are brought together in a radial direction, said first constraining portion being located between said main part and said first support portion, said first constraining portion having an inner diameter smaller than an inner diameter of said main part, said second constraining portion being located between said main part and said second support portion, said second constraining portion having an inner diameter smaller than an inner diameter of said main part;

injecting resin material from a radially peripheral part of said die assembly around said motor rotor; and curing said resin material deposited around said motor rotor.

6. The motor coil molding method according to claim 5, wherein said injecting resin material forces coil wire received in said core slots radially inward.

7. The motor coil molding method according to claim 5, further comprising the step of removing the resin material from an outer circumferential surface of said motor rotor by machining.

8. The motor coil molding method according to claim 5, wherein injecting resin material includes injecting resin material directly into the first and second constraining portions of the die cavity.

9. A motor coil molding method, comprising:

winding coil wire around a motor rotor having a plurality of core slots provided therein, an axial end of said motor rotor defining a coil end, said coil wire being received in said core slots;

placing said motor rotor in a die cavity of a die assembly, said die assembly having a first half and a second half, said die cavity including a main part for receiving a rotor core coaxially therein, and first and second constraining portions jointly defined by said first half and said second half of said die assembly;

supporting said two axial ends of said motor rotor with first and second support portions, respectively, in said die cavity of said die assembly;

radially constraining said coil end with one of said first and second constraining portions of said die assembly as said first half and said second half are brought together in a radial direction, said first constraining portion being located between said main part and said first support portion, said first constraining portion having an inner diameter smaller than an inner diameter of said main part, said second constraining portion being located between said main part and said second support portion, said second constraining portion having an inner diameter smaller than an inner diameter of said main part;

injecting resin material from a radially peripheral part of said die assembly around said motor rotor; and curing said resin material deposited around said motor rotor.

* * * * *